(12) United States Patent
Munro

(10) Patent No.: US 11,169,026 B2
(45) Date of Patent: Nov. 9, 2021

(54) OPTICAL MEASUREMENT SYSTEMS AND METHODS THEREOF

(71) Applicant: Munro Design & Technologies, LLC, Ontario, NY (US)

(72) Inventor: James F. Munro, Ontario, NY (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 0 days.

(21) Appl. No.: 16/698,658

(22) Filed: Nov. 27, 2019

(65) Prior Publication Data

US 2020/0173854 A1 Jun. 4, 2020

Related U.S. Application Data

(60) Provisional application No. 62/773,584, filed on Nov. 30, 2018, provisional application No. 62/798,284, filed on Jan. 29, 2019.

(51) Int. Cl.
| | |
|---|---|
| *G01J 3/28* | (2006.01) |
| *G01J 3/02* | (2006.01) |
| *G01J 3/10* | (2006.01) |
| *G01J 3/45* | (2006.01) |

(52) U.S. Cl.
CPC ............ *G01J 3/2823* (2013.01); *G01J 3/021* (2013.01); *G01J 3/0205* (2013.01); *G01J 3/0208* (2013.01); *G01J 3/0262* (2013.01); *G01J 3/10* (2013.01); *G01J 3/45* (2013.01)

(58) Field of Classification Search
None
See application file for complete search history.

(56) References Cited

U.S. PATENT DOCUMENTS

| | | | | |
|---|---|---|---|---|
| 5,448,365 A | * | 9/1995 | Grollimund | A24C 5/3412 356/430 |
| 5,785,651 A | * | 7/1998 | Kuhn | G01B 11/026 250/339.06 |
| 6,091,075 A | * | 7/2000 | Shibata | G02B 21/241 250/559.44 |

(Continued)

OTHER PUBLICATIONS

Körner, K. et al., "Some aspects of chromatic confocal spectral interferometry," XVIII Imeko World Congress, Sep. 2006.

(Continued)

*Primary Examiner* — Shawn Decenzo
(74) *Attorney, Agent, or Firm* — Troutman Pepper Hamilton Sanders LLP (Rochester)

(57) ABSTRACT

A measurement system includes an optical probe that has a reflective prism structure, an input system, and an output system. The reflective prism structure comprises at least two mirrored surfaces on opposing sides of an axis which extends in a direction towards a target. The input system is positioned to receive and direct source light towards one of the mirrored surfaces which is positioned to reflect the source light towards the target. The output system is positioned to receive and output converging light from reflected light that comprises measurement data related to the target. The reflected light is the source light reflected from the target via the other one of the mirrored surfaces and is without substantial overlap with the source light.

20 Claims, 7 Drawing Sheets

(56) References Cited

U.S. PATENT DOCUMENTS

| | | | |
|---|---|---|---|
| 6,396,576 B1* | 5/2002 | Bleyle | G01N 21/43 |
| | | | 356/128 |
| 7,349,103 B1* | 3/2008 | Balooch | G01J 3/10 |
| | | | 356/601 |
| 7,486,394 B2 | 2/2009 | Lehmann et al. | |
| 7,876,446 B2 | 1/2011 | Körner et al. | |
| 10,018,686 B1* | 7/2018 | Bickford | G01R 33/0047 |
| 2002/0081065 A1* | 6/2002 | Asami | G01J 3/26 |
| | | | 385/31 |
| 2002/0186359 A1* | 12/2002 | Meisburger | G03F 7/70041 |
| | | | 355/69 |
| 2005/0084980 A1* | 4/2005 | Koo | G01J 3/44 |
| | | | 436/171 |
| 2015/0260640 A1* | 9/2015 | Sharpies | G01N 21/1702 |
| | | | 250/208.2 |
| 2016/0084759 A1* | 3/2016 | Hall | G01J 3/501 |
| | | | 356/343 |
| 2017/0067732 A1* | 3/2017 | Li | G02B 7/38 |
| 2018/0275060 A1* | 9/2018 | Xu | G02B 21/367 |
| 2019/0120757 A1* | 4/2019 | Watanabe | G01N 21/3586 |
| 2019/0271592 A1* | 9/2019 | Gray | G01N 21/6428 |
| 2020/0221551 A1* | 7/2020 | Sawanami | G01N 21/8806 |
| 2020/0288110 A1* | 9/2020 | Wang | H04N 13/161 |

OTHER PUBLICATIONS

Lyda, W. et al., "Advantages of chromatic-confocal spectral interferometry in comparison to chromatic confocal microscopy," The 10th International Symposium of Measurement Technology and Intelligent Instruments, Jun. 2011.

Debnath, S. K. et al., "Evaluation of spectral phase in spectrally resolved white-light interferometry: Comparative study of single-frame techniques," Optics and Lasers in Engineering, vol. 47 (2009) 1125-1130.

Protopopov, V., "A Compact Wide-Range Spectrometer With Image Intensifier: Unexpected Advantages, New Functions, and a Variety of Applications", Applied Spectroscopy, May 2012, 66(5): pp. 496-509.

* cited by examiner

OPTICAL MEASUREMENT SYSTEMS AND METHODS THEREOF

This application claims the benefit of U.S. Provisional Patent Application Ser. No. 62/773,584, filed Nov. 30, 2018 and claims the benefit of U.S. Provisional Patent Application Ser. No. 62/798,284, filed Jan. 29, 2019, which are all hereby incorporated by reference in their entirety.

FIELD

This technology generally relates to systems and methods for measuring spectral content of weak optical signals and, more particularly, to systems and methods for generating chromatic optical signals that are indicative of a measured surface parameter, such as displacement.

BACKGROUND

Areal surface interferometry, including areal phase-measuring interferometry, has been used to measure the shape or form of optical surfaces for several decades. While generally quite fast and accurate, prior areal surface interferometry suffers from errors—such as retrace errors—and also introduces unexpected costs and complexities in the surface metrology process.

For example, areal interferometers often depend on test spheres and null correctors, and an error in their fabrication can result in later errors in the surface topography measurement results. Indeed, the infamous surface errors in the primary mirror of the Hubble Space Telescope have been traced to problems with a null corrector. Since that time NASA—and associated manufacturers of large optics—have been seeking non-areal yet non-contact approaches for high-precision surface metrology. Generally, these approaches have entailed the use of an optical probe system that measures displacement of a surface at a given location, and the probe is then scanned across the surface of interest to generate a complete surface profile.

One such prior art optical probe system is the chromatic probe system 10 as shown FIG. 1. As seen in FIG. 1, a broadband light source 15 produces light that is routed to probe 26 through source fiber optic 20, fiber coupler 22, and probe fiber optic 24. Light then exits probe fiber optic 24 in chromatic probe 26 and enters collimating lens 28 which collimates the light. The collimated light enters chromatic lens 30 which causes the collimated light to become focused in a spectrally dispersed manner as chromatic light 31.

Note that the focal position of the chromatic light 31 on optical axis 60 is a function of wavelength, with shorter wavelengths 32 generally coming to a focus closer to chromatic probe 26 than the longer wavelengths 34. A test surface 90 of unknown displacement relative to probe 26 is positioned within the focal field of chromatic light 31 such that one of the wavelengths 33 within chromatic light 31 is well-focused on test surface 90 at measurement spot 36.

Next, a portion of chromatic light 31 is reflected from test surface 90 and re-enters chromatic lens 30 and is re-collimated as it exits chromatic lens 30. The re-collimated light then re-enters collimating lens 28 which then focuses the light reflected from test surface 90 onto the aperture of probe fiber optic 24 where a substantial portion of the light passes through the aperture and enters probe fiber optic 24. The same light then propagates through the probe fiber optic 24 to fiber coupler 22 where approximately half of the light is coupled through output fiber optic 40 to an input of spectrograph 50. The spectrograph 50 spectrally disperses the light and presents an image of the dispersed light on an image sensor of an internal camera. The internal camera in the spectrograph 50 captures and transmits a spectral image to digital processor 52 as an electronic signal. The digital processor 52 analyzes the electronic spectral image to determine the displacement of surface 90 and outputs the displacement information to a user.

Chromatic probes, such as chromatic probe 10 described above, have been available in the market for several years, and are fast and relatively inexpensive. However, because as illustrated above the source light overlaps with the measurement light within probe 26, there can be cross-talk or coupling of the relatively bright source light into the output light stream that corrupts the measurement light, or even masks or veils the measurement light if the measurement light is dim as might be case when test surface is absorptive, angled, or otherwise uncooperative. As a result errors with the measurement of displacement of surface can occur.

SUMMARY

A measurement system includes an optical probe that has a reflective prism structure, an input system, and an output system. The reflective prism structure comprises at least two mirrored surfaces on opposing sides of an axis which extends in a direction towards a target. The input system is positioned to receive and direct source light towards one of the mirrored surfaces which is positioned to reflect the source light towards the target. The output system is positioned to receive and output converging light from reflected light that comprises measurement data related to the target. The reflected light is the source light reflected from the target via the other one of the mirrored surfaces and is without substantial overlap with the source light.

A method of making an optical measurement system includes providing at least one optical probe with a reflective prism structure comprising at least two mirrored surfaces on opposing sides of an axis which extends in a direction towards a target. An input system is positioned to receive and direct source light towards one of the mirrored surfaces, wherein the one of the mirrored surfaces is positioned to reflect the source light towards the target. An output system is positioned to receive and output converging light from reflected light that comprises measurement data related to the target, wherein the reflected light is the source light reflected from the target via the other one of the mirrored surfaces and is without substantial overlap with the source light.

Accordingly, the claimed technology provides a number of advantages including providing systems and methods that more effectively measure spectral content of weak optical signals. Additionally, examples of the claimed technology provide systems and methods for generating interferometric chromatic optical signals that are indicative of a measured surface parameter, such as displacement. With examples of the claimed technology, advantageously source light and measurement light paths are non-overlapping to preclude the corruption, masking, or veiling of weak or dim measurement signals such that measurements can be made of a test surface, even if the test surface is absorptive, angled, or otherwise uncooperative.

DETAILED DESCRIPTION

Figure 1:
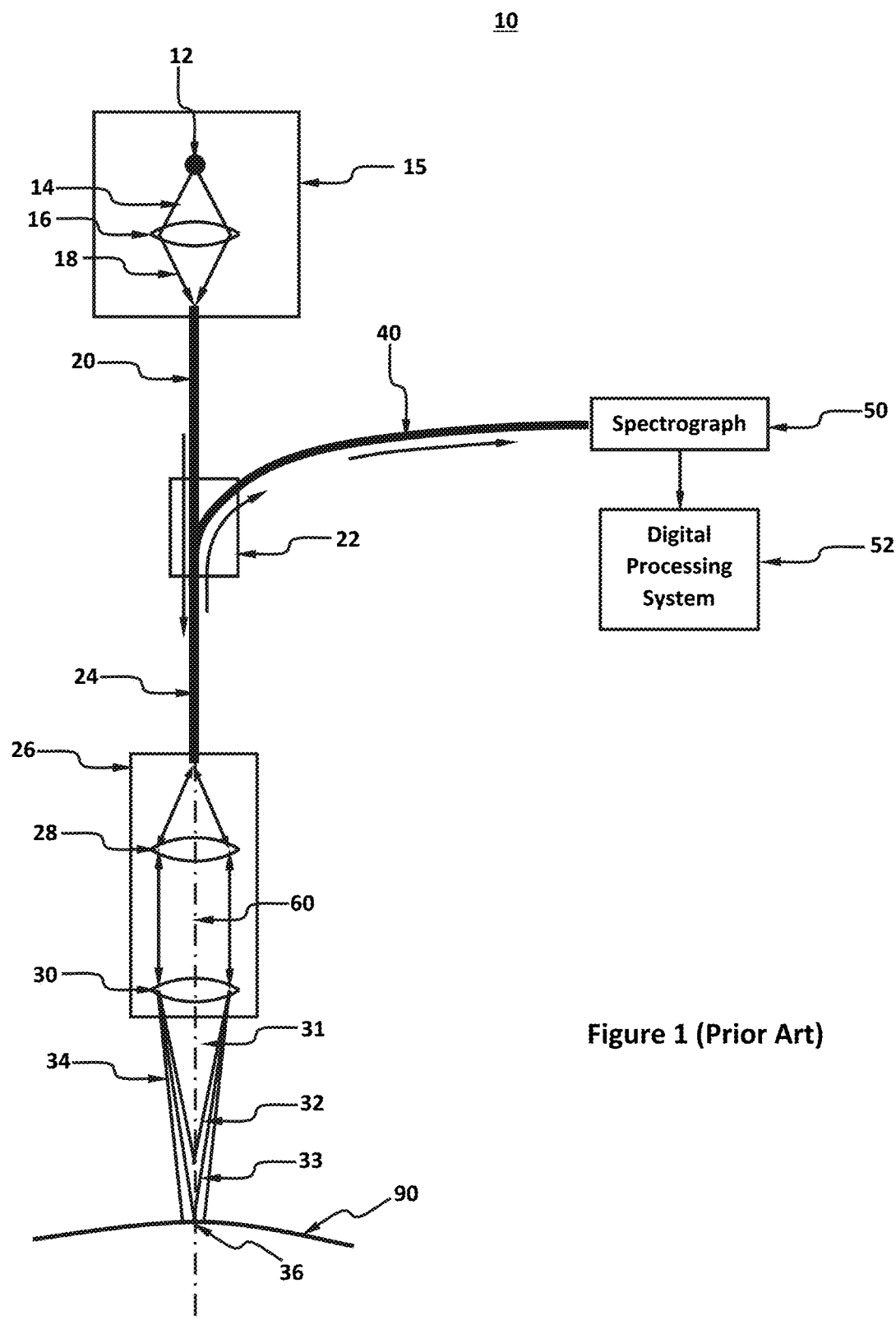
FIG. 1 is a block diagram of a chromatic displacement measuring system having an optical probe found in the prior art.
Figure 2:
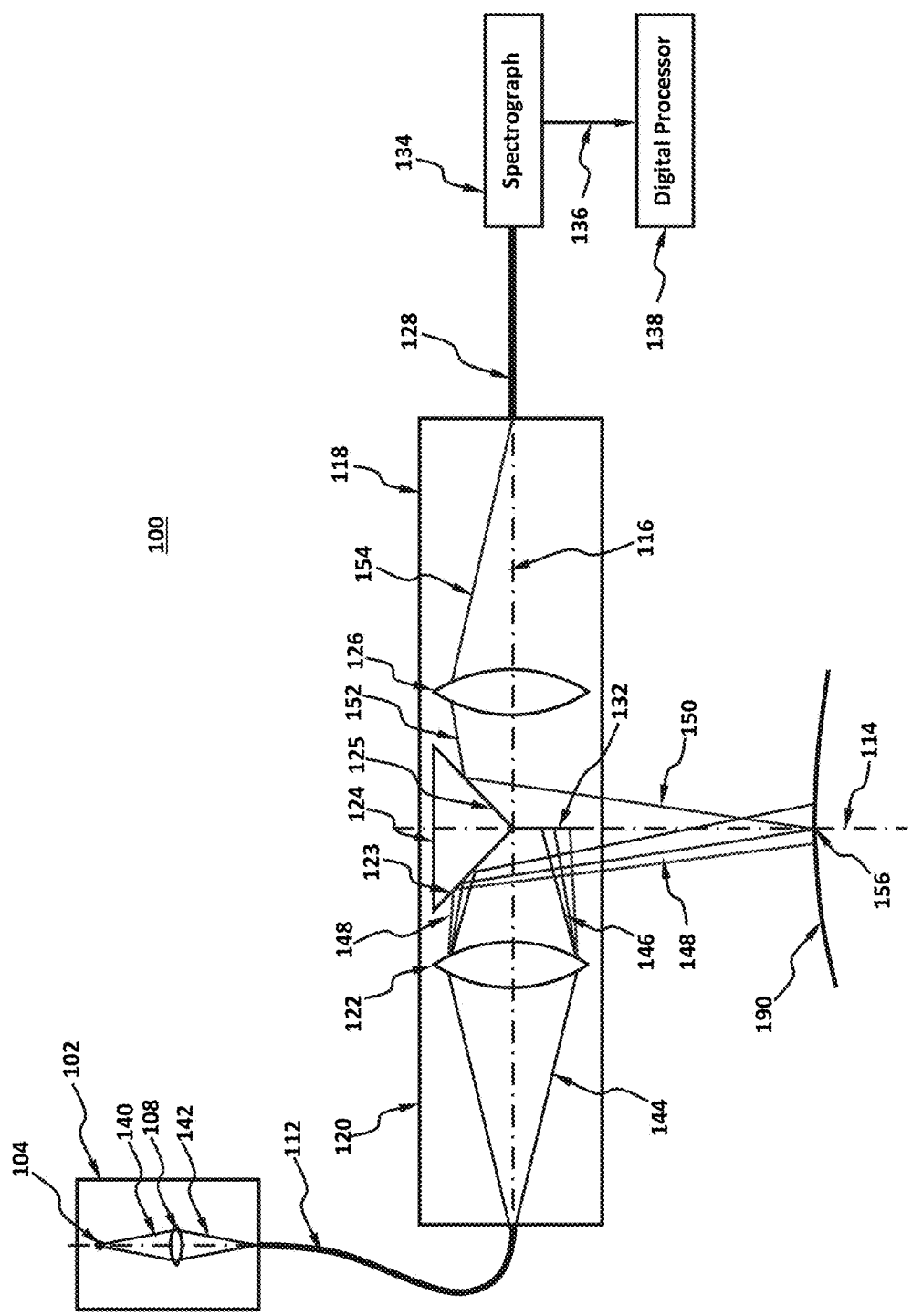
FIG. 2 is a block diagram of an example of a chromatic displacement measurement system with an example of an optical probe.

An example of a chromatic displacement measurement system 100 with an optical probe 120 for measuring displacement is illustrated in FIG. 2. In this example, the chromatic displacement measurement system 100 includes a light source assembly 102, a source fiber optic 112, the optical probe 120, an output fiber optic 128, a spectrograph 134, and a digital processor system 138 to determine a displacement of test surface 190, although other types and/or numbers of other components and/or other elements in other configurations may be used. The claimed technology provides a number of advantages including providing systems and methods that more effectively measure spectral content of weak optical signals.

Referring more specifically to FIG. 2, the light source assembly 102 comprises a light source 104 and a condensing lens 108, although the light source assembly 102 may comprise other types and/or numbers of components and/or other elements in other configurations. In this example, the light source assembly 102 is configured and positioned when activated to provide a source light 140 comprising a broadband white light in this example from light source 104 that is condensed by the condensing lens 108 into a condensed source light which is output into the source fiber optic 112.

The source fiber optic 112 is positioned to couple light output by light source assembly 102 to the input of optical probe 120. In this example, the source fiber optic 112 is preferably a single-mode fiber, having a core diameter less than 10 µm, or in other examples may be less than 5 µm, and transmits all wavelengths of light that are used by optical probe 120, such as 400 nm to 800 nm, to the optical probe 120 with minimal attenuation, although source fiber optic 112 can be a multi-mode having a core diameter up to 0.500 millimeters and/or have other transmission capabilities. Additionally, since the light output by light assembly 102 can be polarized, in some examples the source fiber optic 112 may have polarization-preserving or polarization-maintaining properties. Further, since the light source assembly 102 in many examples will be heat generating it desirable to place the light source assembly 102 a sufficient distance from optical probe 120 so the performance of optical probe 120 is not affected by an adjacent heat source. In some examples of the claimed technology, the length of source fiber optic 112 should be at least one meter, or in some example preferably at least two meters to provide the sufficient distance from the light source assembly 102, provided the length does not significantly attenuate any of the wavelengths transmitted by source fiber 112.

The optical probe 120 is a chromatic probe that may comprise a probe housing 118, an input optical lens 122, a reflective prism 124, an output optical lens 126, and a baffle 132, although the optical probe 120 may comprise other types and/or numbers of other components and/or elements in other configurations. In this example, the optical probe 120 is configured to measure a distance or displacement of an arbitrary reference plane (such as one passing through probe axis 116) to a measurement spot 156 on test surface 190 which is located at the intersection of measurement axis 114 and test surface 190, although the optical probe 120 can perform other types and/or numbers of other measurement or probing operations. In this example, the optical probe 120 has a design that is optimized for minimal stray light in the output optical signal carried through output fiber optic 128 because the output optical signal levels can be extremely small (comprising only a few dozen photons per displacement measurement, for example) and any stray light can overcome such a small signal.

The probe housing 118 is a mechanical component which houses, and onto which are mounted (either directly or through additional mechanical coupling, mounting, and/or positional adjustment components) the output end of source fiber 112, input optical lens 122, mirrored prism 124, output optical lens 126, and the input end of output fiber optic 128, although other types of housings and/or other mounting configurations of components and/or other elements may be used. Being the mechanical component onto which other probe components are mounted, the probe housing 118 in this example is made of a material having a low CTE (coefficient of thermal expansion) so the components mounted onto it do not move relative to one another as the ambient temperature varies which can in turn cause erroneous displacement measurements. As such probe housing 118 can be made of Invar, a metal alloy having an exceptionally low CTE. Additionally, the probe housing 118 in this example completely encloses the components of optical probe 120 listed above, except for the optical aperture associated with chromatic test light 148 and back-reflected test light 150, and be optically opaque, such that stray ambient light does not affect the performance of optical probe 120 and cause erroneous displacement measurements. Further, the interior surface of probe housing 118 should be painted or otherwise coated with a light absorbing material—with light-trapping surface properties—such as a heavily textured black paint, to absorb any stray light that may inadvertently enter into the probe housing 120 from the outside, or inadvertently generated from inside the probe housing 120.

The input optical lens 122 is a chromatic lens that is a refractive optical element that causes the diverging input light 144 incident upon the input optical lens 122 to be transmitted through in such a way that the chromatic test light 148 comes to a sharp focus substantially on optical axis 114, and do so in a dispersive manner such that longer wavelengths are brought to a sharp focus further from input optical lens 122 than the shorter wavelengths (or vice versa). The distance between the focal points at a longer wavelength (such as 800 nm) and a shorter wavelength (such as 400 nm) can be between 0.01 mm and 100 mm. The input optical lens 122 can be a singlet lens element, such as a meniscus lens, and where a surface can be planar, spherical, or aspherical, and be concave or convex if non-planar, although other types and/or numbers of lens may be used. By way of example, the input optical lens 122 may comprise several lens elements, such as six or more, being typically positioned substantially centered on optical axis 116. In one example, the input optical lens 122 is designed to advantageously result in a 1 mm chromatic working range (i.e., maximum to minimum measurement range) at a distance of 10 mm from the measurement side of optical probe 120. In this example, input optical lens 122 is a singlet lens in which the input surface is aspherical and the output surface is spherical, and is composed of S-TIH3 glass from Ohara Inc., (Kanagawa, Japan). Note in other examples that instead of being refractively dispersive, input optical lens 122 can instead be a diffractively dispersive optical element, such as hologram or Fresnel zone plate.

The reflective prism 124 is a five-sided optical object that is substantially shaped like a right-angled prism in cross-section, although other types of prisms and/or other optical elements with other numbers of sides may be used. In this example, two of the five sides of the reflective prism 124, mirrored input side 123 and mirrored output side 125, are substantially planar, highly polished, and specularly reflective. The remaining three sides of the reflective prism 124 are generally unused in these examples, but can be planar as well and have a surface texture that prevents them from being specularly reflective (indeed, the unused sides are generally coated with a light-absorptive material). The mirrored input side 123 is positioned to face the output side of input optical lens 122 and is used to reflect chromatic test light 148 into a direction that causes the spectral foci of the chromatic test light 148 to be in the space of the test surface 190. Similarly, mirrored output side 125 faces output optical lens 126 and is used to reflect back-reflected test light 150 from test surface 190 onto the input side of output optical lens 126. The substrate of reflective prism 124 can be a metal, such as aluminum or steel, or a non-metallic material such as glass, or even a low CTE material such as Zerodur or Invar. The mirrored input side 123 and mirrored output side 125 can be between 2 mm and 20 mm across and between 2 mm and 20 mm in length, can be polished to a flatness better than 0.1 µm peak-to-valley and can be made reflective by the use of a reflective coating, the coating being metallic or dielectric, or the substrate of reflective prism 124 can be a reflective metal, such as aluminum, that is highly polished. If the reflector of reflective prism 124 is a reflective metal, such as aluminum, silver, or gold, then it can be over-coated with a protective layer of SiO or SiO2. Preferably in some examples the reflectance between mirrored input side 123 and mirrored output side 125 is at least 90% over the spectral band of interest (e.g., 400 nm to 800 nm), or, in some example preferably greater than 95%.

The baffle 132 is an opaque optical element that acts to intercept light rays, such as chromatic light 146, and block and prevent them from reaching the output side of optical probe 120 (in this example, the output side is defined as a region of optical probe 120 inside probe housing 118 to the right of measurement axis 114 and the input side is defined as another region of optical probe 120 inside probe housing 118 to the left of measurement axis 114). Any light that were to propagate from the input side (which is generally quite bright) to the output side (where the optical signals are generally dim) can contribute to optical noise and degrade the displacement-measuring performance of the chromatic displacement measurement system 100, especially if the light enters the input aperture of output fiber 128. Baffle 132 and reflective prism 124 cooperatively act to prevent light from crossing the input side of optical probe 120 to the output side, and baffle 132 can occupy one side of reflective prism 124 (as shown in FIG. 2), or more than one side, or even circumscribe a periphery of reflective prism 124. Baffle 132 should have textured light-absorbing surfaces, and even have light-trapping properties or features, to minimize reflections of any light incident upon it. Baffle 132 can be a (blackened) metal such as aluminum or steel, or a non-metallic material such as glass or polymer, or even a low CTE material such as Zerodur or Invar.

The output optical lens 126 is a chromatic lens that is a refractive optical element that causes the diverging reflected chromatic test light 152 incident upon it to be transmitted through the output optical lens 126 in such a way that the converging output light 154 comes to a focus substantially on probe axis 116, at the entrance aperture of output fiber optic 128, and do so for all wavelengths (such as 400 nm to 800 nm) that can be present in the converging output light 154. Output optical lens 126 can be a singlet lens element, such as a meniscus lens, and can have a prescription where a surface is planar, spherical, or aspherical, and be concave or convex if non-planar. In this example output optical lens 126 is a singlet, although in other examples the optical lens 126 may comprise several lens elements, such as six or more, being typically positioned substantially centered on probe axis 116. I another example, output optical lens 126 which has a prescription that is substantially the same as input optical lens 122, but the output and input sides are reversed. In this example, the output optical lens 126 is a singlet lens in which the output surface is aspherical and the input surface is spherical, and is composed of S-TIH3 glass from Ohara Inc., (Kanagawa, Japan). Note that instead of being refractively dispersive, output optical lens 126 can instead be a diffractively dispersive optical element, such as hologram or Fresnel zone plate.

The output fiber optic 128 is used to couple the light output by optical probe 120 to an input of spectrograph 134. In this example, the output fiber optic 128 is a single-mode fiber, having a core diameter less than 10 µm, or in some examples less than 5 µm, and transmits all wavelengths of light that are used by optical probe 120, such as 400 nm to 800 nm, from the optical probe 120 to spectrograph 134 with minimal attenuation, although source fiber optic 128 can be a multi-mode having a core diameter up to 0.500 millimeters and/or have other transmission capabilities. Additionally, since the light output by optical probe 120 can be polarized, examples of the output fiber optic 128 may have polarization-preserving or polarization-maintaining properties. Further, since the spectrograph 134 in many examples will be heat generating it desirable to place the spectrograph 134 a sufficient distance from optical probe 120 so the performance of optical probe 120 is not affected by this adjacent heat source. In some examples of the claimed technology, the length of source fiber optic 112 should be at least one meter, or in some example preferably at least two meters to provide the sufficient distance from the spectrograph 134, provided the length does not significantly attenuate any of the wavelengths transmitted by source fiber 128.

The spectrograph 134 spectrally disperses the light from the source fiber optic 128 and whose resulting spectral image from this dispersed light is captured by a camera within spectrograph 134, although the spectrograph 134 may comprise other types and/or numbers of components and/or other elements in other configurations.

The digital processor system 138 in this example may include one or more processors, a memory, and/or a communication interface, which are coupled together by a bus or other communication link, although the digital processor system 138 can include other types and/or numbers of elements in other configurations and also other types of processing systems may be used. The processor(s) of digital processor system 138 may execute programmed instructions stored in the memory for the any number of the functions described and illustrated herein. The processor(s) of digital processor system 138 may include one or more CPUs or general purpose processors with one or more processing cores, for example, although other types of processor(s) can also be used although the digital processor system 138 may comprise other types and/or numbers of components and/or other elements in other configurations.

The memory of the digital processor system 138 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

The communication interface of the digital processor system 138 operatively couples and communicates to the spectrograph 134 by a communication system, although other types and/or numbers of communication systems with other types and/or numbers of connections and/or configurations to other devices and/or elements can also be used.

Examples of one or more portions of the claimed technology as illustrated and described by way of the examples herein may also be embodied as one or more non-transitory computer readable media having instructions stored thereon for one or more aspects of the present technology, such as the memory of the digital processor system 138. The instructions in some examples include executable code that, when executed by one or more processors, such as the processor(s) of the digital processor system 138, cause the one or more processors to carry out steps necessary to implement the methods of the examples of this technology that are described and illustrated herein An example of a method for measuring displacement with the chromatic displacement measurement system 100 will now be described with reference to FIG. 2. In this example, when the light source 104 is activated condensed broadband light is input into the source fiber optic 112 and exits as diverging input light 144 which illuminates input optical lens 122.

In this example, input optical lens 122 is highly chromatic, or dispersive, by design, such that the output light from input optical lens 122 comprises chromatic light 146 and chromatic test light 148 that has a focal length that is a strong function of wavelength (in general shorter wavelengths of light within chromatic light 146 and chromatic test light 148 have shorter focal lengths than the focal lengths of the longer wavelengths). In this example, the chromatic light 146 is incident on baffle 132 and is substantially absorbed and prevented from reaching the output side of optical probe 120. Additionally, in this example the chromatic test light 148 is incident on the mirrored input side 123 of the reflective prism 124 and is reflected down and out of the probe housing 118 towards test surface 190. By design, each dispersed wavelength of chromatic test light 148 comes to focus substantially on measurement axis 114, at a distance from the optical probe 120 that varies in accordance with the wavelength.

If the test surface 190 has a polished finish, then the reflection of chromatic test light 148 from test surface 190 will reflect into a direction in accordance with the Law of Reflection as illustrated by back-reflected test light 150. Note that if test surface 190 has a textured surface, or if test surface 190 has a polished surface and is highly sloped with respect to measurement axis 114 then the brightness of back-reflected test light 150 will be very weak, possibly being several orders of magnitude dimmer than chromatic test light 148.

The back-reflected test light 150, whether from a specular or diffuse reflection from test surface 190, that re-enters optical probe 120 will reflect from the mirrored output side 125 of the reflective prism 124 and become incident on the output chromatic lens 126 which then redirects the light into converging test light 154 in such a way that converging test light 154 is incident upon the core of output fiber optic 128, for any wavelength, and thereupon enters the probe fiber optic 128. Note that other wavelengths of chromatic test light 148, which are incident on test surface 190 at locations other than measurement spot 156 on test axis 114 (because these wavelengths are out of focus) will in this example have only a very, very small portion of their back-scattered optical flux incident upon the core of probe fiber optic 128 and therefore will not enter the probe fiber optic 128. That is, if test surface 190 is a single surface (as opposed, to, for example, a stack of plastic films which produce multiple reflections from test axis 114) then the light of converging test light 154 will be substantially monochromatic, and the wavelength of the converging test light 154 is indicative of the displacement or distance between test surface 190 and optical probe 120 (shorter wavelengths are generally associated with smaller displacements since the shorter wavelengths come to a focus closer to optical probe 120 along test axis 114).

Note that the output face of source fiber optic 112, the focal location of measurement spot 156, and the input face of output fiber optic 128 are conjugates of one another; however, light is prevented—either directly or indirectly by way of glare or Fresnel reflection—from reaching the input face of the output fiber optic 128 from the output face of the input fiber optic 112 by virtue of the baffle 132. Since there are no common or overlapping optical paths or surfaces there between that the light traverses as the light travels from the output face of the source fiber optic 112 to the input face of the output fiber optic 128, this greatly reduces the possibility of stray light from the brighter optical signals on the input side of the optical probe 120 from reaching the input aperture or core of output fiber optic 128. This is one of the advantages of examples of the claimed technology and is intended to minimize the amount of spurious stray light that can be output by the chromatic probe into output fiber optic 128.

The converging test light 154 that is indicative of the displacement or distance between test surface 190 and optical probe 120 propagates through the probe fiber optic 120 to an input of spectrograph 134. The spectrograph 134 spectrally disperses the light and presents an image of the dispersed light on an image sensor of an internal camera. The internal camera in the spectrograph 134 captures and transmits a spectral image to the digital processor system 138 as an electronic signal. The digital processor system 138 analyzes the electronic spectral image to determine the displacement of surface 90 and may output the displacement data to a user, although other locations for and/or processing of the displacement data may be performed.

Figure 3:
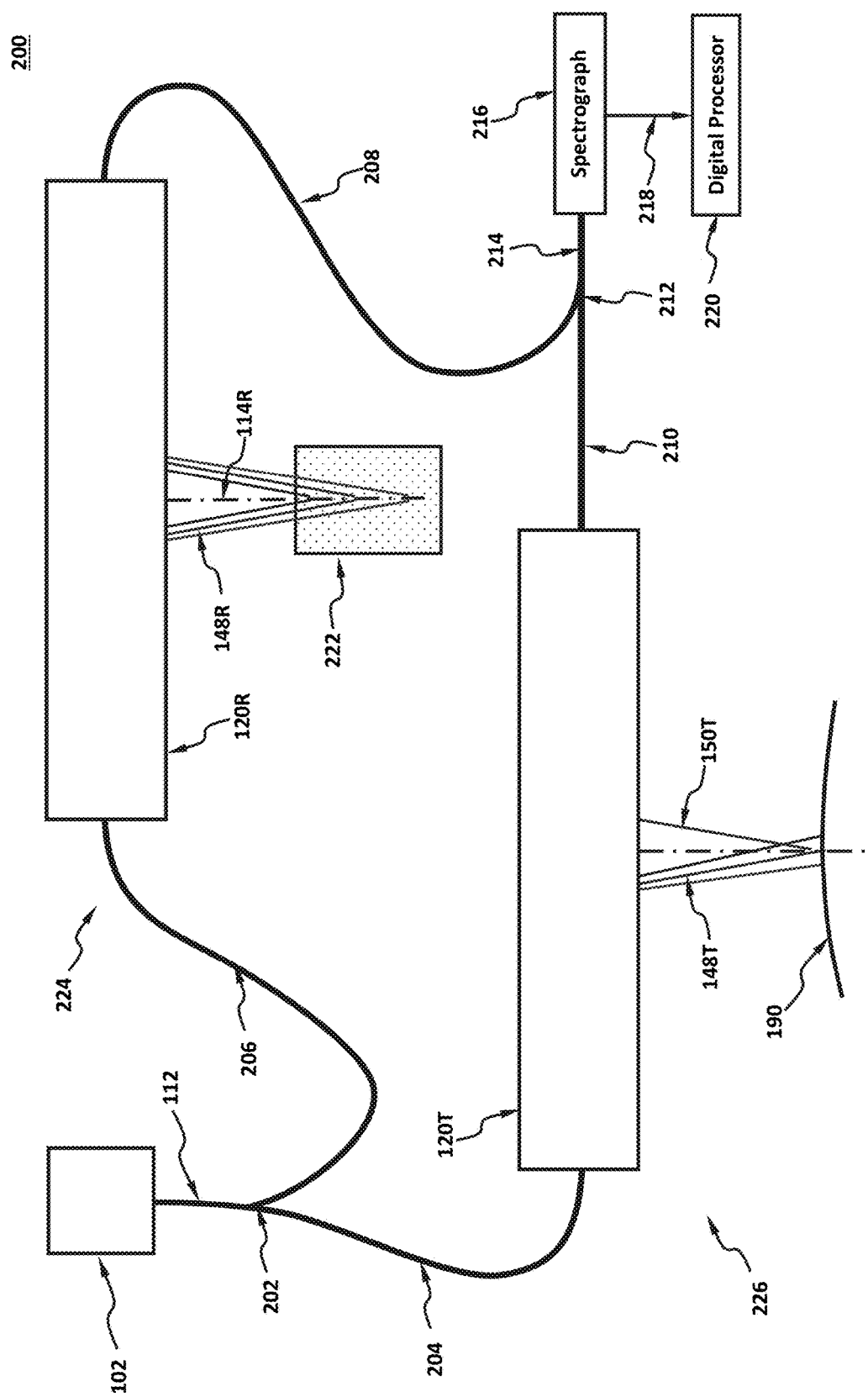
FIG. 3 is a block diagram of an example of a spectral interferometric chromatic measurement system with two of the optical probes.

Referring to FIG. 3, an example of a spectral interferometer displacement measurement system 200 with two of the optical probes is illustrated. In this example, elements of chromatic displacement measurement system 100 illustrated and described with reference to FIG. 2 which are like those in spectral interferometer displacement measurement system 200 in structure and operation, will have like reference numerals and will not be described again in detail. By way of example, the light source assemblies 102 in FIGS. 2 and 3 are the same in structure and operation, except as otherwise illustrated or described by way of the examples herein. Additionally, the reference optical probe 120R and test optical probe 120T are each the same in structure and operation as the optical probe 120 illustrated and described with reference to the example in FIG. 2, except as otherwise illustrated or described by way of the examples herein. Similarly, the spectrograph 216 in the example in FIG. 3 is the same in structure and operation as the spectrograph 134 in the example in FIG. 2 except as otherwise illustrated or described by way of the examples herein. Further, the digital processor system 220 in the example in FIG. 3 is the same in structure and operation as the digital processor system 138 in the example in FIG. 2 except as otherwise illustrated or described by way of the examples herein.

In this example, the spectral interferometer displacement measurement system 200 has a pair of chromatic probes, namely reference optical probe 120R and test optical probe 120T that are arranged to cooperatively act as an interferometer to accurately determine the displacement of test surface 190 from test optical probe 120T as illustrated in FIG. 3. Like optical probe 120, the reference optical probe 120R and the test optical probe 120T each retain no common or overlapping optical paths or surfaces that their internal light paths propagate through (or reflect from), and intrinsically have minimal spurious stray light signals present at their outputs.

In this example, the interferometric probe system 200 includes a light source assembly 102, a fiber splitter 202, a test arm 226, a reference arm 224, a coupler 212, a spectrograph 216, and a digital processor system 220, although the interferometric probe system 200 may comprise other types and/or numbers of other components and/or other elements in other configurations. The fiber splitter 202 which splits light from light source assembly 102 when activated and passing through source fiber optic 112 into test probe input fiber 204 and reference probe input fiber 206.

The test arm 226 comprises a test probe input fiber 204, the test optical probe 120T, a test surface 190, and the test probe output fiber 210. The reference arm 224 includes a reference probe input fiber 206, the reference optical probe 120R, a reference block 222, and a reference probe output fiber 208.

The coupler 212 combines the light output by reference optical probe 120R and passing through reference probe output fiber 208 with the light output by test optical probe 120T and passing through test probe output fiber 210, and outputs the combined light into spectrometer input fiber 214.

An example of another method for measuring displacement with the interferometric chromatic measurement system 200 will now be described with reference to FIG. 3. In this example, the structure and operation of the reference optical probe 120R and test optical probe 120T are each the same as previously illustrated and described with reference to optical probe 120 in the example in FIG. 2, except as otherwise illustrated or described by way of the examples herein.

In this example, the light source assembly 102 outputs broadband light (e.g., 400 nm to 800 nm) into source fiber optic 112 which is split by fiber splitter 202 such that a portion of the source light is directed into reference arm 224 through reference probe input fiber 206 and another portion of the source light is directed through test probe input fiber 204 into test optical probe 120T.

The test optical probe 120T outputs light through test probe output fiber 210 where the wavelength of the output light is indicative of the displacement between test optical probe 120T and test surface 190. The output light passes through coupler 212 and spectrograph input fiber 214 and enters spectrograph 216 where the light is dispersed and imaged onto an internal camera as previously illustrated and described above with reference to spectrograph 134 in the example in FIG. 2.

The reference optical probe 120R outputs light through reference probe output fiber 208, but in this example, unlike the output light from the test optical probe 120T, the light output from the reference optical probe 120R is broadband (e.g., 400 nm to 800 nm). In this example, the output light from the reference optical probe 120R is broadband because the reference light includes all possible wavelengths of light that can be output by the test optical probe 120T, such that interference between the light output by the two probes (i.e., 120R and 120T) can be made to occur when they are later both incident and overlapping in the spectral image produced by the spectrograph 216. Therefore, instead of a reference surface as is commonly used in interferometers, the reference arm 224 includes a reference block 222 which will simultaneously diffusely scatter or back-reflect chromatic test light 148R back into reference optical probe 120R (as back-reflected reference light 150R) for every wavelength.

The interference pattern present in the spectral image produced in spectrograph 216, which has a wavelet waveform at the spectral region of interference, is captured and digitized by the camera internal to the spectrograph 216, and the digitized image is transmitted electronically through spectrograph output 218 to digital processor system 220.

The digital processor system 220 executes one or more measurement algorithms on the wavelet image to determine the displacement of test surface 190 with high accuracy, such as a discrete Fourier transform (DFT) by way of example only. Note that because of the nature of a wavelet function, which has several inflection points and areas of high-slope, the underlying interferometric quantity OPD (Optical Path Difference) can be localized with great accuracy, such that the displacement can be determined with nanometer-level accuracy. Further, this level of accuracy can be attained even when test surface 190 is non-cooperative (e.g., absorptive, diffusive, or highly polished and sloped) and back-reflected test light 150T is dim, by virtue of the "interferometric gain term" inherent in interferometric systems and by virtue of the fact that the weak signal light output by test optical probe 120T is not corrupted by stray light within optical probe 120T as discussed earlier.

Figure 4:
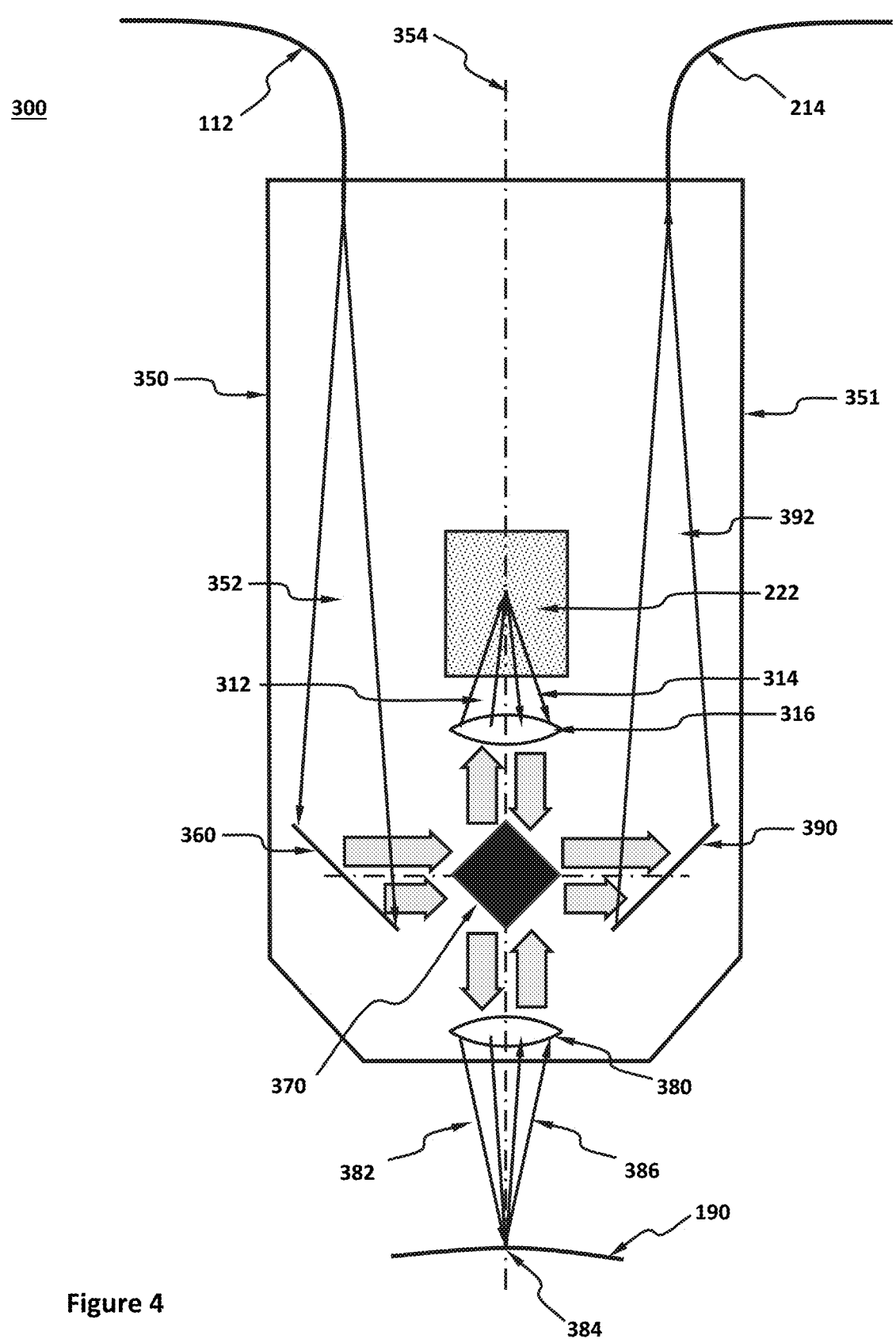
FIG. 4 is a diagram of an example of a spectral interferometric chromatic measurement system with an example of an integrated spectral interferometric chromatic probe.
Figure 5:
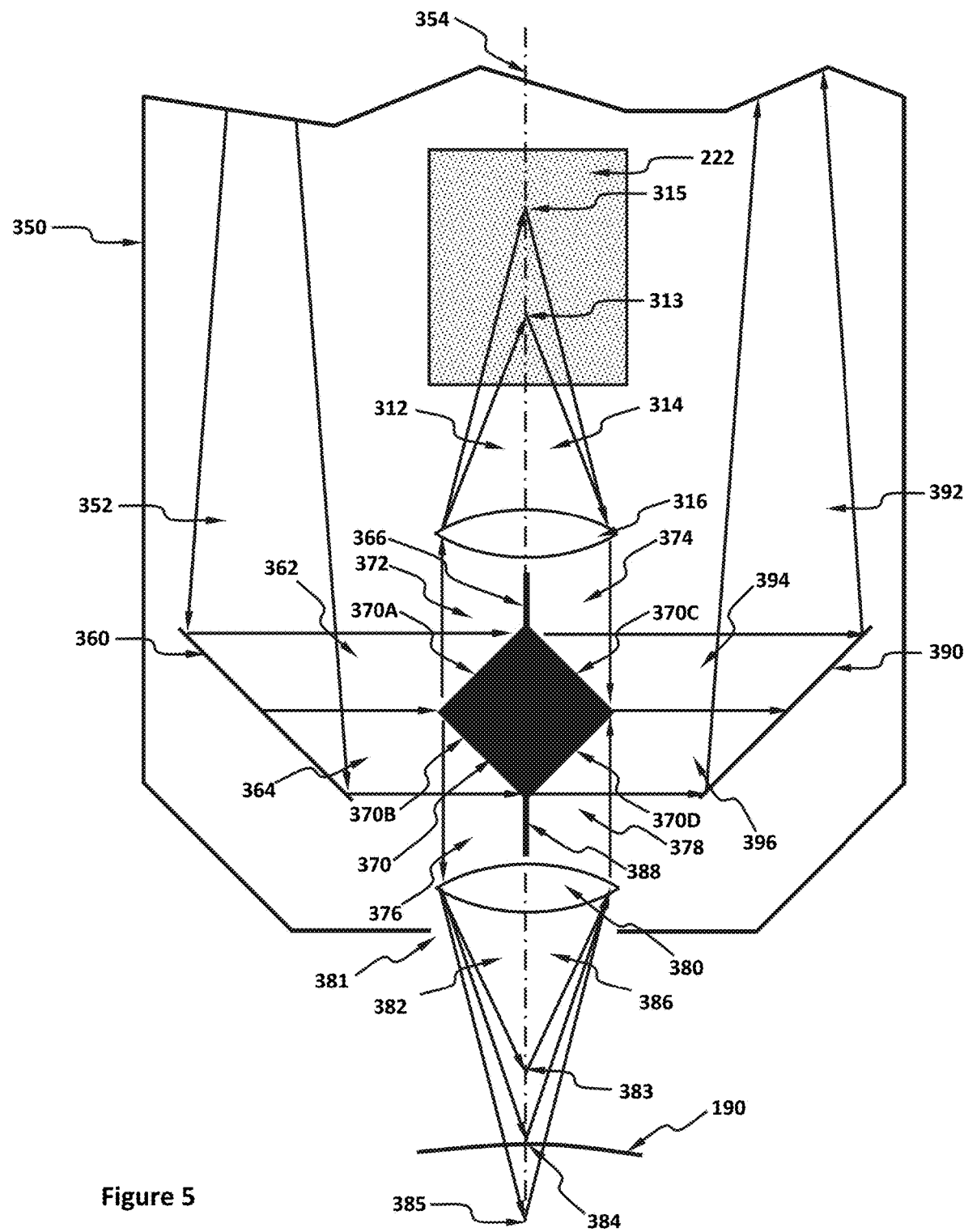
FIG. 5 is an enlarged view of the diagram pf the example of the integrated spectral interferometric chromatic probe shown in FIG. 4.

Referring to FIGS. 4 and 5, an example of a spectral interferometric chromatic measurement system 300 with an example of an integrated spectral interferometric chromatic probe 350 is illustrated. In this example, the integrated spectral interferometric chromatic probe 350 has the features of having no common or overlapping optical paths or surfaces that the light traverses as the light travels from the input fiber output to the output fiber optic.

The integrated spectral interferometric chromatic probe 350 comprises a housing 351 in which is placed an input right angle parabolic mirror (RAPM) 360, a beamsplitter 370, a reference arm chromatic lens 316, a reference block 222, a measurement arm chromatic lens 380, and an output RAPM 390, although the integrated spectral interferometric chromatic probe 350 may comprise other types and/or numbers of other components and/or other elements in other configurations.

The integrated spectral interferometric chromatic probe 350 is a device for creating spectral interference fringes, and has a source arm, from which light is introduced into the interferometer, a reference arm that has optics that produce a relatively known optical signal, a measurement arm that has optics that produce a relatively unknown optical signal that carries information about an unknown property of a test surface 90 or test object, and an output arm that carries the combined reference arm optical signal and measurement arm optical signal to a downstream processing sub-system, such as digital processor system 138 or digital processing system 220 illustrated and described in the examples in FIGS. 2 and 3, to process signals as illustrated and described by way of the examples herein. The source arm of integrated spectral interferometric chromatic probe 350 includes the output end or aperture of source fiber 112 and input RAPM 360, although the source arm may comprise other types and/or numbers of other components and/or other elements in other configurations. The reference arm comprises reference arm chromatic lens 316 and reference block 222, although the reference arm may comprise other types and/or numbers of other components and/or other elements in other configurations. The measurement arm comprises measurement arm chromatic lens 380 and a test surface 190 (external to integrated spectral interferometric chromatic probe 350), although the measurement arm may comprise other types and/or numbers of other components and/or other elements in other configurations. Finally, the output arm of integrated spectral interferometric chromatic probe 350 comprises output RAPM 390 and the input end or aperture of output fiber 214, although the output arm may comprise other types and/or numbers of other components and/or other elements in other configurations. A central beamsplitter 370 is shared amongst the four arms and its reflective surfaces are used to reflect light into and out of the four arms as described below.

The input RAPM 360 is positioned and functions to collimate diverging source light 352, and reflect the collimated light into a direction that causes it to be incident on the input surfaces of beamsplitter 370. Since the collimation occurs over a broad spectral range, a reflective optic (which has no dispersion) is preferred in this example over a refractive optical element. Further, the input RAPM 360 is located at a distance from the exit aperture of source fiber 112 sufficient so that the diffracting light exiting the exit aperture of source fiber 112 has expanded enough to substantially fill the reflecting surface of the input RAPM 360. Typically, the distance from the exit aperture of source fiber 112 to the input RAPM 360 is between 25 mm and 300 mm, with 100 mm being a typical distance in these examples. For the light reflected from input RAPM 360 to be collimated, the exit aperture of source fiber 112 in this example is located at the focal point of the input RAPM 360, meaning the focal length of the input RAPM 360 is accordingly between 25 mm and 300 mm, with 100 mm being a typical focal length. The diameter of input RAPM 360 can be between 5 mm and 50 mm.

The beamsplitter 370 is a six-sided optical object that is substantially shaped like a parallelepiped. Four of the six sides, 370A, 370B, 370C, and 370D, as seen in FIG. 5, are substantially planar, highly polished, and specularly reflective. The remaining two sides (substantially square and parallel to the plane of the paper) are generally unused, but can be planar as well, although having a surface texture that prevents them from being specularly reflective (indeed, the two unused sides are generally coated with a light-absorptive material). Two of the reflective sides, surfaces 370A and 370B, face the input RAPM 360 and are used to reflect collimated light from the input RAPM 360 into the reference arm (via surface 370A) and into the measurement arm (via surface 370B). The two other reflective sides, surfaces 370C and 370D, face output RAPM 390 and are used to reflect collimated light from the reference arm to the output RAPM 390 (via surface 370C) and from the measurement arm to the output RAPM 390 (via surface 370D). The substrate of beamsplitter 170 can be a metal such as aluminum or steel, or a non-metallic material such as glass, or even a low CTE material such as Zerodur or Invar. The four reflective surfaces, 370A, 370B, 370C, and 370D, can be between 2 mm and 20 mm across and between 2 mm and 20 mm in length, and can be polished to a flatness better than 0.1 µm peak-to-valley. Also the intersection between two adjacent surfaces (e.g., between surface 370A and 370B) can be dead-sharp, or at least having an edge radius of less 10 µm to minimize stray light and maximize the optical utilization of the adjoining surfaces.

The measurement arm chromatic lens 380 is a refractive optical element that causes the collimated measurement input light 376 incident upon measurement arm chromatic lens 380 to be transmitted through the measurement arm chromatic lens 380 in such a way that the light comes to a sharp focus substantially on optical axis 354, and do so in a dispersive manner such that longer wavelengths are brought to a sharp focus further from measurement arm chromatic lens 380 than the shorter wavelengths. The distance between the focal points at a longer wavelength (such as 800 nm) and a shorter wavelength (such as 400 nm) can be between 0.01 mm and 100 mm, and it is highly desirable that the relationship between focal distance and wavelength is a substantially linear relationship. Measurement arm chromatic lens 380 may comprise a singlet, or in other examples may comprise several lens elements, such as six or more, being typically positioned substantially centered on optical axis 354. One advantageous example of the measurement arm chromatic lens 380 results in a 1 mm chromatic working range (i.e., maximum to minimum measurement range) at a distance of 13.5 mm from the output surface of chromatic lens 380. In this example, the measurement arm chromatic lens 380 is a singlet lens in which the input surface is aspherical with a base radius of curvature of 10.274 mm and a −0.356105 conic constant, the output surface is spherical with a 35.419 mm radius of curvature, a center thickness of 3.5 mm, and is composed of S-TIH3 glass from Ohara Inc., (Kanagawa, Japan).

The test surface 190 is the surface whose displacement, or distance, from integrated spectral interferometric chromatic probe 350, or a reference point on integrated spectral interferometric chromatic probe 350 such as the apex of the lower (output) surface of measurement arm chromatic lens 380, is to be measured. A displacement-measuring interferometer system 300 that includes the integrated spectral interferometric chromatic probe 350 is generally capable of measuring the displacement at only one location on test surface 190 at a time, such as at measurement spot 384 and therefore in order to measure the topography of test surface 190 the integrated spectral interferometric chromatic probe 350 in this example is translated across test surface 190 in at least one, but in some example preferably two axis. Note that if the maximum to minimum displacement of the topography of test surface 190 exceeds the working measurement range of integrated spectral interferometric chromatic probe 350 then integrated spectral interferometric chromatic probe 350 will have to translate in the vertical direction as well during the scanning to accommodate the wide variations in displacement. The test surface 190 can be a surface of a relatively small object, having a measurement width as small as 1 mm, or a surface of a relatively large object having a width as large as ten meters or more. The test surface 190 can be highly polished, such as a telescope mirror, or have a texture. The test surface 190 can be a metallic surface, such as aluminum, gold, or silver, or a non-metallic surface such as glass or even polymer. The test surface 190 can be substantially perpendicular to the optical axis 354 of integrated spectral interferometric chromatic probe 350, or can be tilted with respect to optical axis 354 up to 60 degrees (in any direction with respect to optical axis 354) or even up to 80 degrees. As such, the light back-reflected or back-scattered from test surface 190 back into integrated spectral interferometric chromatic probe 350 through measurement arm chromatic lens 380, such as the diverging chromatic test light 386, can be either diffusely or specularly reflected from test surface 190, and can be between 0.000001% and 99.99% of the converging chromatic test light 382 directed onto test surface 190.

The reference arm chromatic lens 316 in this example is a refractive optical element that causes the collimated measurement input light 372 incident upon the reference arm chromatic lens 316 to be transmitted through the reference arm chromatic lens 316 in such a way that the light comes to a sharp focus substantially on optical axis 354 within reference block 222, and do so in a dispersive manner such that longer wavelengths are brought to a sharp focus further from reference arm chromatic lens 316 than the shorter wavelengths. The distance between the focal points at a longer wavelength (such as 800 nm) and a shorter wavelength (such as 400 nm) can be between 0.01 mm and 100 mm, and it is highly desirable that the relationship between focal distance and wavelength is a substantially linear relationship. The reference arm chromatic lens 316 can be a singlet lens element, such as a meniscus lens, and can have a prescription where a surface is planar, spherical, or aspherical, and can be concave or convex if non-planar. The reference arm chromatic lens 316 may comprise a singlet, or may comprise several lens elements, such as six or more, being typically positioned substantially centered on optical axis 316. One advantageous example of the reference arm chromatic lens 316, whose chromatic performance is matched with the prescription presented for measurement arm chromatic lens 380, has a prescription in which reference arm chromatic lens 316 is a meniscus singlet lens in which the input surface is aspherical with a base radius of curvature of 6.611 mm and a 0.15111 conic constant, the output surface is spherical with a 36.366 mm radius of curvature, a center thickness of 3.5 mm, and is composed of S-TIH3 glass from Ohara Inc., (Kanagawa, Japan).

The reference block 222 is a solid block of material that has bulk-diffusive properties (as opposed to surface-diffusers which will not function well in the present invention), and will diffusely reflect or scatter light that is incident upon it into any direction. In this example, the reference block 222 will diffusely scatter converging chromatic measurement light 312 being focused within it back to reference arm chromatic lens 316 as diverging chromatic reference light 314, and will also diffusely scatter converging chromatic measurement light 312 into the remaining portion of the volume surrounding reference block 222. The reference block 222 can be shaped like a parallelepiped or cylindrically shaped with a length of between 2 mm and 200 mm and a diameter of from 2 mm to 200 mm. The reference block 222 may comprise a glass-ceramic composite material such as Zerodur in which sub-micron sized particles are distributed within a glass matrix, wherein the particles, having a refractive index different than the surrounding glass, will diffusely scatter any light propagating through the material. Alternately, the reference block 222 may comprise a polymer, many of which, such as nylon, polyester, Teflon, acetal, polyethylene, polystyrene, and polypropylene, are inherently bulk-diffusive. The light scattering (i.e., the bulk diffusing of light) can be caused by scattering elements within a medium wherein the scattering elements are atomic, molecular, or particulate in nature.

The output RAPM 390 is positioned and functions to focus the collimated output light incident upon it from the beamsplitter 370 (namely reflected output reference light 394 and reflected output measurement light 396) and reflect the resulting converging output light 392 into a direction that causes it to be incident on the entrance aperture of output fiber 214. Since the focusing occurs over a broad spectral range, a reflective optic (which has no dispersion) is preferred over a refractive optical element. Further, the output RAPM 390 in this example is located at some distance from the entrance aperture of output fiber 214 so the focusing can occur over a reasonable distance. The distance from the output RAPM 390 to the entrance aperture of output fiber 214 can be between 25 mm and 300 mm, with 100 mm being a typical distance. For the reflected light to be focused onto the entrance aperture of output fiber 214, the entrance aperture of output fiber 214 in this example is located at the focal point of the output RAPM 390, meaning the focal length of the output RAPM 390 is accordingly between 25 mm and 300 mm, with 100 mm being a typical focal length. A width of the output RAPM 390 can be between 5 mm and 50 mm. The operative surface of output RAPM 390 can be made reflective by the use of a reflective coating, the coating being metallic or dielectric, or the substrate of output RAPM 390 can be a reflective metal, such as aluminum, that is polished to the correct optical prescription.

The housing 351 is a mechanical component which houses, and onto which are mounted (either directly or through additional mechanical coupling, mounting, and/or positional adjustment components) the output end of source fiber 112, the input RAPM 360, the beamsplitter 370, the reference arm chromatic lens 316, the reference block 222, the measurement arm chromatic lens 380, the output RAPM 390, and the input end of output fiber optic 214, although other types of housings and/or other mounting configurations of components and/or other elements may be used. The housing 351 in this example is the component onto which the other interferometer components are mounted and is made of a material having a low CTE (coefficient of thermal expansion) so the components mounted onto the housing 351 do not move relative to one another as the ambient temperature varies which can in turn cause erroneous displacement measurements. Additionally, the housing 351 in this example completely encloses the components of the integrated spectral interferometric chromatic probe 350 listed above, except for the optical aperture 381 associated with measurement arm chromatic lens 380, and be optically opaque, such that stray ambient light does not affect the performance of integrated spectral interferometric chromatic probe 350 and cause erroneous displacement measurements. Further, the interior surface of housing 351 in this example is painted or otherwise coated with a light absorbing material—with light-trapping surface properties—such as a heavily textured black paint, to absorb any stray light that may inadvertently enter into the housing 351 from the outside, or inadvertently generated from inside the housing 351.

The reference arm baffle 366 is an opaque optically absorptive light-barrier installed in the space between the beamsplitter 370 and the reference arm chromatic lens 316 on optical axis 354. Similarly, the measurement arm baffle 388 is an opaque optically absorptive light-barrier installed in the space between beamsplitter 370 and the measurement arm chromatic lens 380 on the optical axis 354. Note that the reference arm baffle 366 in this example conforms precisely to the upper edge of beamsplitter 370 (the edge being formed by the intersection of the beamsplitter surfaces 370A and 370C) so there is no gap there-between that stray light can pass through. Similarly, measurement arm baffle 388 in this example conforms precisely to the lower edge of the beamsplitter 370 (the edge being formed by the intersection of the beamsplitter surfaces 370B and 370D) so there is no gap there-between that stray light can pass through.

An example of another method for measuring displacement with the spectral interferometric chromatic measurement system 300 with the integrated spectral interferometric chromatic probe 350 will now be described with reference to FIGS. 4-5. In this example, light that enters integrated spectral interferometric chromatic probe 350 exits from source fiber optic 112 is shown as a diverging source light 352, whose divergence is due primarily to the light being diffracted as it exits from single mode source fiber optic 112. Diverging source light 352 is then incident on input RAPM 360 which collimates the light reflected from it and also reflects the collimated light 90 degrees such that the collimated reflected light becomes incident on two mirrored sides of beamsplitter 370, namely input side 370A and input side 370B.

As shown in greater detail in FIG. 5, the upper source light 362 reflects from input surface 370A into input reference light 372 which is then incident on the reference arm chromatic lens 316. The reference arm chromatic lens 316 then causes input reference light 372 to come to a sharp focus within reference block 222 through converging chromatic reference light 312. Note, however, that since the reference arm chromatic lens 316 is designed to be highly dispersive, the sharp focus for each wavelength occurs at a different position on optical axis 354 within reference block 222. For example, longer wavelength light, such as light having a wavelength of 800 nm, is shown coming to a focus at long wavelength focal position 315 while shorter wavelength light, such as light having a wavelength of 400 nm, is shown coming to a focus as short wavelength focal position 313.

The reference block 222, comprising a bulk-diffusive material, will diffuse or otherwise scatter the light propagating within the reference block, including the light that is brought to a sharp focus along optical axis 354. In this example, light that is brought to a focus along optical axis 354, including that light at long wavelength focal position 315, short wavelength focal position 313, and all positions there-between, has a portion of its light back-scattered into diverging chromatic reference light 314 which subsequently becomes incident on the reference arm chromatic lens 316.

The reference arm chromatic lens 316 collimates and effectively de-achromatizes the diverging chromatic reference light 314 and outputs output the reference light 374 which then becomes incident on the mirrored output surface 370C of the beamsplitter 370. The output reference light 374 is reflected from output surface 370C into reflected output reference light 394, which is still collimated, which is then incident on output the RAPM 390. The output RAPM 390 then both causes the collimated reflected output reference light 394 to come to a focus, and reflects the reflected output reference light 394 into a direction such that the reflected light, converging output light 392, comes to a sharp focus at the entrance aperture of output fiber 214.

Similar to the reference arm light propagation described above, the test (or measurement) arm light propagation will now be described below. As mentioned earlier the diverging source light 352 is incident on the input RAPM 360 which collimates the light reflected from it and also reflects the collimated light 90 degrees such that the collimated reflected light becomes incident on two mirrored surfaces of the beamsplitter 370, namely the input surface 370A and the input surface 370B.

The lower source light 364 then reflects from input surface 370B into input measurement light 376 which is then incident on the measurement arm chromatic lens 380. Measurement arm chromatic lens 380 then causes input measurement light 376 to come to a sharp focus along the optical axis 354 in the measurement space through converging chromatic measurement light 382. Note, however, that since measurement arm chromatic lens 380 in this example is designed to be highly dispersive, the sharp focus for each wavelength occurs at a different position on optical axis 354 at or near test surface 190. For example, longer wavelength light, such as light having a wavelength of 800 nm, is shown coming to a focus at long wavelength focal position 385 while shorter wavelength light, such as light having a wavelength of 400 nm, is shown coming to a focus as short wavelength focal position 383.

A test surface 190 will reflect or back-scatter a portion (i.e., that portion that was not absorbed) of all light incident upon it, including the light that is brought to a sharp focus along the optical axis 354 at measurement spot 384. A portion of light from the measurement spot 384 is back-reflected as diverging chromatic measurement light 386 which subsequently becomes incident on measurement arm chromatic lens 380.

The measurement arm chromatic lens 380 collimates and effectively de-achromatizes the diverging chromatic measurement light 386 and outputs output measurement light 378 which then becomes incident on mirrored output surface 370D of beamsplitter 370. The output measurement light 378 is reflected from the output surface 370D into reflected output measurement light 396, which is still collimated, which is then incident on the output RAPM 390. The output RAPM 390 then both causes the collimated reflected output measurement light 396 to come to a focus, and reflects the reflected output measurement light 396 into a direction such that the reflected light, part of converging output light 392, comes to a sharp focus at the entrance aperture of output fiber 214.

Note that in this example substantially all of the reference arm light that enters output fiber 214 did so after passing through reference block 222, and by virtue of reference arm baffle 366 substantially no light passed directly from the input RAPM 360 to the output RAPM 390 through the space between beamsplitter 370 and reference arm chromatic lens 316. Additionally, in this example substantially all of the measurement arm light that enters output fiber 214 did so after being back-scattered or back-reflected from test surface 190, and by virtue of measurement arm baffle 388 substantially no light passed directly from the input RAPM 360 to output RAPM 390 through the space between the beamsplitter 370 and the measurement arm chromatic lens 380. Further, by virtue of the reference arm baffle 366, the measurement arm baffle 388, the beamsplitter 370, and the configuration of the integrated spectral interferometric chromatic probe 350, the reference arm light (i.e., upper source light 362, input reference light 372, converging chromatic reference light 312, diverging chromatic reference light 314, output reference light 374, reflected output reference light 394) are kept from coinciding, or overlapping, or at least partially overlapping or coinciding with the measurement arm light (i.e., the lower source light 364, the input measurement light 376, the converging chromatic measurement light 382, the diverging chromatic measurement light 386, the output measurement light 378, and the reflected output measurement light 396) with the result that there is no cross-talk between the reference arm light and measurement arm light and the integrated spectral interferometric chromatic probe 350 maintains a high level of signal to noise.

Figure 6:
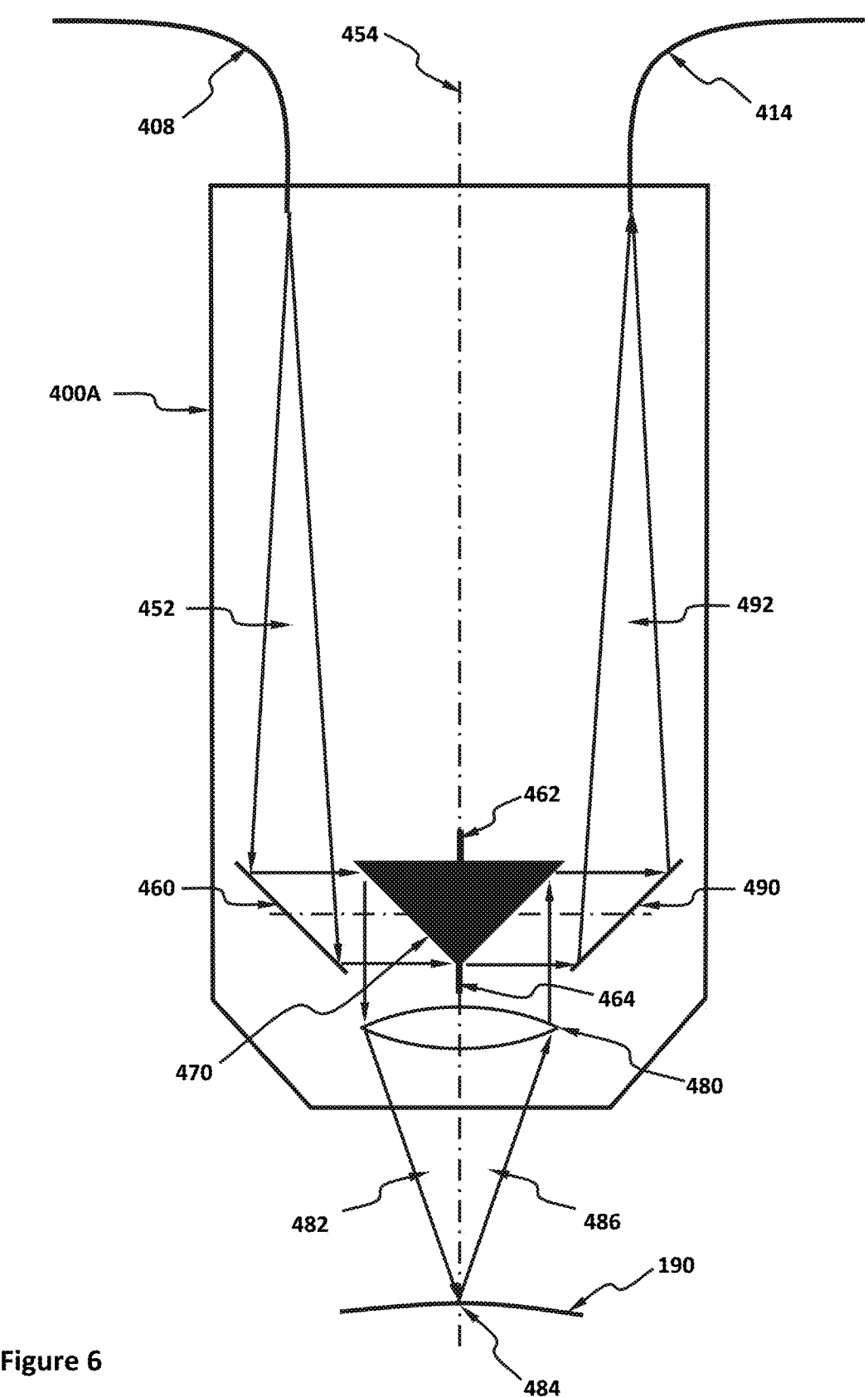
FIG. 6 is a block diagram of another example of a chromatic displacement measurement system.
Figure 7:
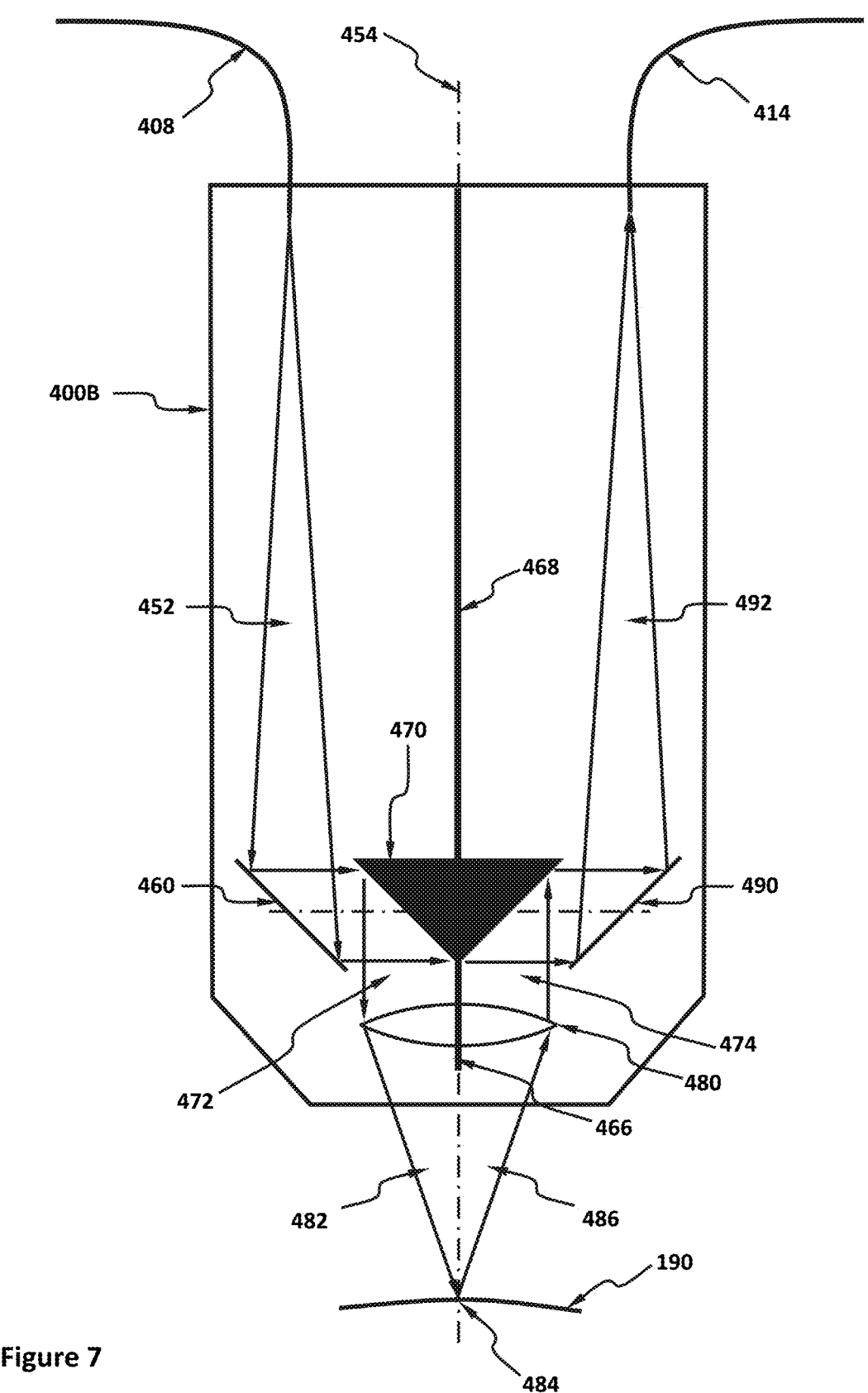
FIG. 7 is a block diagram of yet another example of a chromatic displacement measurement system.

Referring to FIGS. 6 and 7, other examples of chromatic probe 450 is illustrated. In this example, the chromatic probes 400A and 400B are each the same in structure and operation as the integrated spectral interferometric chromatic probe 350, except as otherwise illustrated or described by way of the examples herein.

In this example, unlike the integrated spectral interferometric chromatic probe 350, the chromatic probes 400A and 400B each have no reference arm and therefore is not an interferometer. The chromatic probes 400A and 400B in these examples are also similar to the example of the optical probe 120 illustrated in FIG. 2, except that the chromatic probes 400A and 400B each have a single chromatic lens (instead of two) and the single chromatic lens is located on the test side of the reflective prism instead of on the input/output sides of the prism which allows for a greater working distance between each of the chromatic probes 400A and 400B and a test surface 190.

Each of the chromatic probes 400A and 400B comprises an input RAPM 460, a reflective prism 470, a chromatic lens 480, and an output RAPM 490, although the chromatic probe 400 may comprise other types and/or numbers of components and/or other elements in other configurations. Additionally, in this example: the input RAPM 460 is the same in structure and operation as the input RAPM 360 illustrated and described with reference to the example in FIGS. 4-5; the reflective prism 470 is the same in structure and operation as the corresponding measurement arm portion of the beamsplitter 370; the chromatic lens 480 that in this example is typically positioned substantially centered on optical axis 454 is the same in structure and operation as the measurement arm chromatic lens 380 that is typically positioned substantially centered on optical axis 354 as illustrated and described with reference to the example in FIGS. 4-5; and the output RAPM 490 is the same in structure and operation as the output RAPM 390 illustrated and described with reference to the example in FIGS. 4-5.

Additionally, the example: the diverging source light 452 is the same as the diverging source light 352 illustrated and described with reference to the example in FIGS. 4-5; the converging chromatic test light 482 is the same as the converging chromatic test light 382 illustrated and described with reference to the example in FIGS. 4-5; the measurement spot 484 is the same as the measurement spot 384 illustrated and described with reference to the example in FIGS. 4-5; the diverging chromatic test light 486 is the same as the diverging chromatic test light 386 illustrated and described with reference to the example in FIGS. 4-5; and converging output light 492 is the same as the converging output light 392 illustrated and described with reference to the example in FIGS. 4-5.

The chromatic probe 400A in this example also includes a lower baffle 464 and an upper baffle 462 which act to prevent stray light from propagating directly from the input RAPM 460 to the output RAPM 490, such that the signal light (i.e., that back-reflected or back-scattered from test surface 190) is not degraded or corrupted by the presence of the stray light as the signal light exits chromatic probe 400 through output fiber optic 414.

As an extra precaution, in another example illustrated with the chromatic probe 400B, the upper baffle 462 can be lengthened such that the upper baffle 462 further optically separates the input and output light paths, the lengthened upper baffle being extended upper baffle 468 as illustrated by way of example in FIG. 7. As yet another extra precaution, also illustrated with the chromatic probe 400B, the lower baffle 464 can be lengthened such that it further optically separates the input and output light paths, the lengthened lower baffle being extended lower baffle 466 as illustrated by way of example in FIG. 7. Note that in this example the extended lower baffle 466 can even extend through chromatic lens 480 for an additional measure of input/output light path isolation and stray light mitigation, although the lower baffle 466 could extend to greater or lesser lengths in other examples.

Note that the optical probe 120, the optical probe 120T, the integrated spectral interferometric chromatic probe 350, and the chromatic probe 400 each can be laterally scanned (in one or both directions across test surface 190, or the test surface 190 can be laterally translated instead, such that the full surface of test surface 190 can be probed and measured to determine its topographic shape or profile. Alternately, instead of there being a single test surface 190, there can be two or more test surfaces arranged along the optical axis, often with a non-unity refractive index between them. Further, the refractive index is often unknown, but can be determined with great precision with the high signal-to-noise ratio (SNR) probe examples described above.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. An optical measurement system comprising:
   at least one optical probe, wherein the optical probe further comprises:
   a reflective structure comprising at least two mirrored outer surfaces on opposing sides of an axis which extends in a direction out from the reflective structure towards a target, wherein the reflective structure is configured to be spaced from the target and comprises a consolidated structure that has an edge of each of the two mirror surfaces converging at the axis;
   an input system comprising at least one input optical element positioned to receive and direct source light towards one of the mirrored surfaces, wherein the one of the mirrored surfaces is positioned to reflect the source light towards the target;

an output system comprising at least one output optical element positioned to receive and output converging light from reflected light that comprises measurement data related to the target, wherein the reflected light is the source light reflected from the target via the other one of the mirrored surfaces and is without substantial overlap with the source light.

2. The system as set forth in claim 1 further comprising:
at least one baffle is positioned to block at least a portion of the measurement light and extends along the axis from the reflective structure in a direction towards the target.

3. The system as set forth in claim 1 wherein:
the input optical element comprises at least one chromatic lens to receive the source light and direct measurement chromatic light from the source light towards one of the at least two mirrored surfaces, wherein the one of the mirrored surfaces is positioned to reflect wavelengths of the measurement chromatic light that each come to focus substantially on the axis at a distance from the optical probe that varies in accordance with each of the wavelengths; and
the output optical element comprises at least one other chromatic lens positioned to receive the reflected chromatic light from the measurement chromatic light reflected from the other one of the mirrored surfaces and to output the converging light from the reflected chromatic light that comprises the measurement data related to the target.

4. The system as set forth in claim 1 wherein the at least one optical probe further comprises at least one other optical probe, wherein the other optical probe further comprises:
another reflective structure comprising at least two other mirrored surfaces on opposing sides of an axis which extends in a direction towards a reference block;
another input system positioned to receive and direct a portion of the source light towards one of the other mirrored surfaces, wherein the one of the other mirrored surfaces is positioned to reflect the portion of the source light towards the reference block; and
another output system positioned to receive reference reflected light from the portion of the source light reflected from the reference block via the other one of the other mirrored surfaces and to output reference converging light from reference reflected light that comprises reference data related to the reference block and is without substantial overlap with the source light.

5. The system as set forth in claim 1 wherein the reflective structure comprises a beamsplitter with the at least two mirrored surfaces on opposing sides of an axis which extends in a direction towards a target and the input system further comprises an input right angle parabolic mirror positioned to receive and direct the source light towards one of the mirrored surfaces, wherein the system further comprises:
at least one chromatic lens that receives the source light from the input right angle parabolic mirror and directs measurement chromatic light from the source light towards the target, wherein the wavelengths of the measurement chromatic light each come to focus substantially on the axis at a distance from the optical probe that varies in accordance with each of the wavelengths; and
wherein the output system further comprises an output right angle parabolic mirror positioned to receive reflected chromatic light from the other one of the mirrored surfaces without any substantial overlap with the source light and to output converging light from the reflected chromatic light that comprises measurement data related to the target.

6. The system as set forth in claim 5 further comprising:
at least one baffle that blocks at least a portion of the source light and is positioned to extend along the axis from the beamsplitter in a direction towards the target.

7. The system as set forth in claim 6 wherein the at least one baffle extends through the chromatic lens.

8. The system as set forth in claim 5 wherein:
the beamsplitter further comprises at least two additional mirrored surfaces on opposing sides of the axis which extends in an opposing direction towards a reference block;
the input right angle parabolic mirror is positioned to receive and direct a portion of the source light towards one of the additional mirrored surfaces, the one of the additional mirrored surfaces is positioned to reflect the portion of the source light towards the reference block; and
the output right angle parabolic mirror is positioned to receive reference reflected light and to output reference converging light from the reference reflected light that comprises reference data related to the reference block, wherein the reference reflected light is the portion of the source light reflected from the reference block via the other one of the additional mirrored surfaces and is without substantial overlap with the source light.

9. The system as set forth in claim 8 further comprising:
at least two baffles positioned to block at least a portion of the source light, wherein one of the baffles is positioned to extend along the axis from the beam splitter in a direction towards the target and the other one of the baffles extends along the axis from the beam splitter in a direction towards the reference block.

10. An optical measurement system comprising:
a reflective structure comprising at least two mirrored outer surfaces on opposing sides of an axis which extends in a direction out from the reflective structure towards a target, wherein the reflective structure is configured to be spaced from the target;
an input system comprising at least one input optical element positioned to receive and direct source light towards one of the mirrored surfaces, wherein the one of the mirrored surfaces is positioned to reflect the source light towards the target;
an output system comprising at least one output optical element positioned to receive and output converging light from reflected light that comprises measurement data related to the target, wherein the reflected light is the source light reflected from the target via the other one of the mirrored surfaces and is without substantial overlap with the source light,
a light source positioned to direct source light on the input system;
a spectrograph with an image sensor coupled to receive the output converging light, wherein the spectrograph is configured to spectrally disperse the output converging light on the image sensor to generate spectral image data; and
a processor coupled to the image sensor to receive and process the generated spectral image data to determine the measurement data.

11. A method of making an optical measurement system, the method comprising:
providing at least one optical probe, wherein the providing the optical probe further comprises:

providing a reflective structure comprising at least two mirrored outer surfaces on opposing sides of an axis which extends in a direction out from the reflective structure towards a target, wherein the reflective structure is configured to be spaced from the target and comprises a consolidated structure that has an edge of each of the two mirror surfaces converging at the axis;

positioning an input system comprising at least one input optical element to receive and direct source light towards one of the mirrored surfaces, wherein the one of the mirrored surfaces is positioned to reflect the source light towards the target;

positioning an output system comprising at least one output optical element to receive and output converging light from reflected light that comprises measurement data related to the target, wherein the reflected light is the source light reflected from the target via the other one of the mirrored surfaces and is without substantial overlap with the source light.

12. The method as set forth in claim 11 further comprising:
positioning at least one baffle to block at least a portion of the measurement light and extends along the axis from the reflective structure in a direction towards the target.

13. The method as set forth in claim 11 wherein:
the input optical element comprises at least one chromatic lens to receive the source light and direct measurement chromatic light from the source light towards one of the at least two mirrored surfaces, wherein the one of the mirrored surfaces is positioned to reflect wavelengths of the measurement chromatic light that each come to focus substantially on the axis at a distance from the optical probe that varies in accordance with each of the wavelengths; and
the output optical element comprises at least one other chromatic lens positioned to receive the reflected chromatic light from the measurement chromatic light reflected from the other one of the mirrored surfaces and to output the converging light from the reflected chromatic light that comprises the measurement data related to the target.

14. The method as set forth in claim 11 wherein providing at least one optical probe further comprises providing at least one other optical probe, wherein the other optical probe further comprises:
providing another reflective structure comprising at least two other mirrored surfaces on opposing sides of an axis which extends in a direction towards a reference block;
positioning another input system to receive and direct a portion of the source light towards one of the other mirrored surfaces, wherein the one of the other mirrored surfaces is positioned to reflect the portion of the source light towards the reference block; and
positioning another output system to receive reference reflected light from the portion of the source light reflected from the reference block via the other one of the other mirrored surfaces and to output reference converging light from reference reflected light that comprises reference data related to the reference block and is without substantial overlap with the source light.

15. The method as set forth in claim 11:
wherein the providing the reflective structure further comprises providing a beamsplitter with the at least two mirrored surfaces on opposing sides of an axis which extends in a direction towards a target;

wherein the positioning the input system further comprises positioning an input right angle parabolic mirror positioned to receive and direct the source light towards one of the mirrored surfaces, the method further comprising:
positioning at least one chromatic lens to receive the source light from the input right angle parabolic mirror and direct measurement chromatic light from the source light towards the target;
wherein the wavelengths of the measurement chromatic light each come to focus substantially on the axis at a distance from the optical probe that varies in accordance with each of the wavelengths; and
wherein the positioning the output system further comprises positioning an output right angle parabolic mirror positioned to receive reflected chromatic light from the other one of the mirrored surfaces without any substantial overlap with the source light and to output converging light from the reflected chromatic light that comprises measurement data related to the target.

16. The method as set forth in claim 15 further comprising:
providing at least one baffle that blocks at least a portion of the source light and is positioned to extend along the axis from the beamsplitter in a direction towards the target.

17. The method as set forth in claim 16 wherein the at least one baffle extends through the chromatic lens.

18. The method as set forth in claim 15 wherein:
the providing the beamsplitter further comprises providing the beamsplitter with at least two additional mirrored surfaces on opposing sides of the axis which extends in an opposing direction towards a reference block;
the positioning the input right angle parabolic mirror further comprises positioning the input right angle parabolic mirror to receive and direct a portion of the source light towards one of the additional mirrored surfaces, the one of the additional mirrored surfaces is positioned to reflect the portion of the source light towards the reference block, the method further comprising:
positioning at least one other chromatic lens to receive the portion of the source light from the input right angle parabolic mirror and direct measurement chromatic light from the portion of the source light towards the reference block; and
wherein the positioning the output right angle parabolic mirror further comprises positioning the output right angle parabolic mirror to receive reference reflected light and to output reference converging light from the reference reflected light that comprises reference data related to the reference block;
wherein the reference reflected light is the portion of the source light reflected from the reference block via the other one of the additional mirrored surfaces and is without substantial overlap with the source light.

19. The method as set forth in claim 18 further comprising:
positioning at least two baffles to block at least a portion of the source light, wherein one of the baffles is positioned to extend along the axis from the beam splitter in a direction towards the target and the other one of the baffles extends along the axis from the beam splitter in a direction towards the reference block.

20. A method comprising:
providing a reflective structure comprising at least two mirrored outer surfaces on opposing sides of an axis which extends in a direction out from the reflective structure towards a target, wherein the reflective structure is configured to be spaced from the target;
positioning an input system comprising at least one input optical element to receive and direct source light towards one of the mirrored surfaces, wherein the one of the mirrored surfaces is positioned to reflect the source light towards the target;
positioning an output system comprising at least one output optical element to receive and output converging light from reflected light that comprises measurement data related to the target, wherein the reflected light is the source light reflected from the target via the other one of the mirrored surfaces and is without substantial overlap with the source light
positioning a light source to direct source light on the input lens system;
coupling a spectrograph with an image sensor to receive the output converging light, wherein the spectrograph is configured to spectrally disperse the output converging light on the image sensor to generate spectral image data; and
coupling a processor to the image sensor to receive and process the generated spectral image data to determine the measurement data.

\* \* \* \* \*